March 4, 1969     E. J. SOLTYSIK     3,430,904

FASTENING DEVICE

Filed Dec. 19, 1966

INVENTOR.
Edmund J. Soltysik
BY

His Att'ys

United States Patent Office 3,430,904
Patented Mar. 4, 1969

3,430,904
FASTENING DEVICE
Edmund J. Soltysik, Chicago, Ill., assignor to Illinois Tool Works Inc., Chicago, Ill., a corporation of Delaware
Filed Dec. 19, 1966, Ser. No. 602,695
U.S. Cl. 248—68                                  8 Claims
Int. Cl. F16l 3/22

ABSTRACT OF THE DISCLOSURE

A sheet metal clip for mounting rods or tubes in parallel relation to an aperture work support with the retaining portion being capable of handling tubes or rods of different diameters, within a designed range of sizes, in semi-positive retention.

---

This invention relates to sheet metal fastening devices and more particularly to clips for retaining rod-like members such as tubes, rods or wires in parallel relation to a supporting workpiece. The techniques of maintaining elongated rod-like members adjacent to a work support are quite sophisticated, however, most of the prior devices have failed to positively retain the rod-like member against inadvertent removal. Also, most prior devices are incapable of accommodating rods having a wide range of diameters in cross section.

An object of the present invention is to provide a sheet metal clip adapted to carry one or more tubes or rods in parallel relation to the surface of an apertured work support in semi-positive mounted position and which will not permit inadvertent removal of the tube or rod.

Another object of the invention is to provide a device which is capable of handling workpieces having a plurality of diameters within a specified range as well as to provide an inexpensive snap fastening clip which can be readily assembled to the work support.

Other objects will become apparent, in part, to those skilled in the art when the description is read in conjunction with the accompanying drawings wherein.

Figure 2:
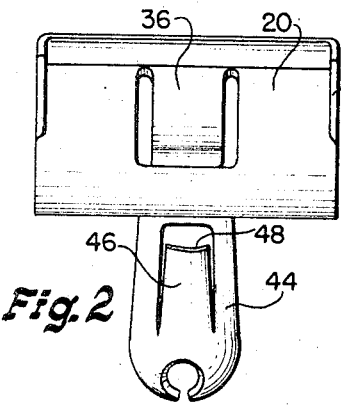
FIG. 2 is an end view of the device shown in FIG. 1.
Figure 1:
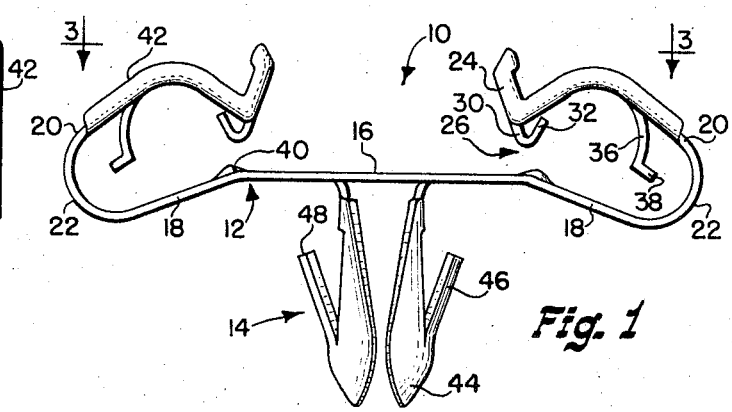
FIG. 1 is a side elevational view of an embodiment of this invention.
Figure 3:
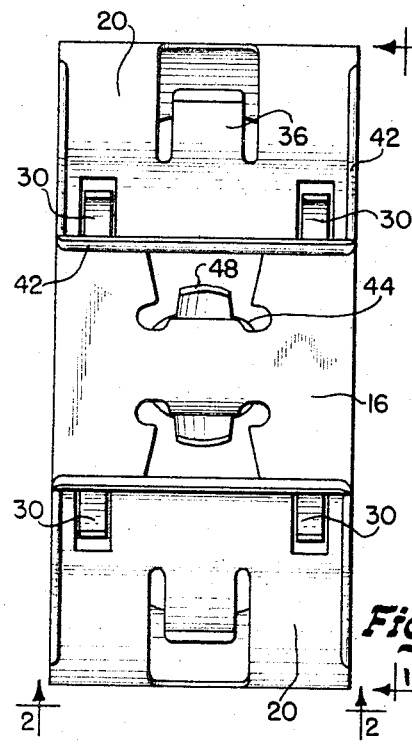
FIG. 3 is a plan view of the device shown in FIG. 1 taken along line 3—3.

Referring now to the drawing, wherein similar parts are designated by similar numerals throughout the drawing, a clip 10 of the type contemplated by the present invention is preferably fabricated from strip sheet metal stock capable of being hardened to provide spring characteristics for the functioning of the clip. The clip 10 includes a head element 12 and a stud element 14. The head element 12 preferably includes a straight central portion 16 and in the preferred embodiment a pair of outwardly and downwardly inclined arms 18 which extend from opposite sides of the central portion 16. Connected to the extremity of each of the arms 18 is a reversely bent portion 20 with a bight portion 22 forming an overall hook-like configuration. The reversely bent portion 20 extends in overlying opposed relation to arm 18 and intermediate its ends is bent downwardly toward arm 18 and thence upwardly at its terminal end portion 24 to form a throat 26. The reversely bent portion 20 in the vicinity of its terminal end portion 24 is provided with restraining means such as a tab 30 which is preferably struck from the confines of the clip material, for purposes of economy in fabrication, and extends downwardly toward arm 18 in the plane of terminal end portion 24. Tab 30 is reversely bent intermediate its extremities to provide a second segment 32 which extends back toward the reversely bent portion 20 to form a smooth abutment surface. Thus, tab 30 further restricts the throat 26. In the preferred embodiment in FIGS. 1–4 there are two tabs 30 provided on each of the reversely bent portions 20 and are located adjacent the side edges of the clip. It should be noted, however, that a single tab could be centrally located in the reversely bent portion 20 and still carry out the function of the present invention.

Struck from the confines of the reversely bent portion 20 and extending toward bight portion 22 and downwardly into the space between portion 20 and arm 18 is a second means 36 in the form of a curvilinear spring arm which is concave toward said arm 18 and throat 26 and terminates in a reversely bent portion 38 to provide a smooth terminal end to the concave curvilinear surface. The function of arm 36 will be best set forth hereinafter. Adjacent the throat 26 it is preferable to provide protuberance means 40 having cammed surfaces which are coined or struck from the material of arm 18 and extend into throat 26 toward tab 30 for purposes best set forth hereinafter.

It has been found desirable to provide a rigidifying flange 42 which encircles terminal end portion 24 and extends along the edges of reversely bent portion 20 but terminates short of flexible bight portion 22. Flange 42 not only strengthens these portions but also presents a smooth edge which will not damage the elongated workpieces which are introduced through throat 26.

The stud element 14 includes a pair of legs 44 which, in the preferred embodiment, are struck from within the confines of the material of central portion 16 and arms 18 and extend perpendicularly below central portion 16. The legs 40 are preferably curved in transverse section and concave towards one another to provide a bullet nose type of configuration at their extremity for ease of introduction into an apertured workpiece as well as to provide axial rigidity to the stud section. Intermediate the extremities of each of the legs 44 an arm 46 is struck therefrom with the terminal end of each arm providing shoulder means 48 in opposition to the central portion 16. Other forms of stud elements which could be utilized will be apparent to those skilled in the art.

Figure 4:
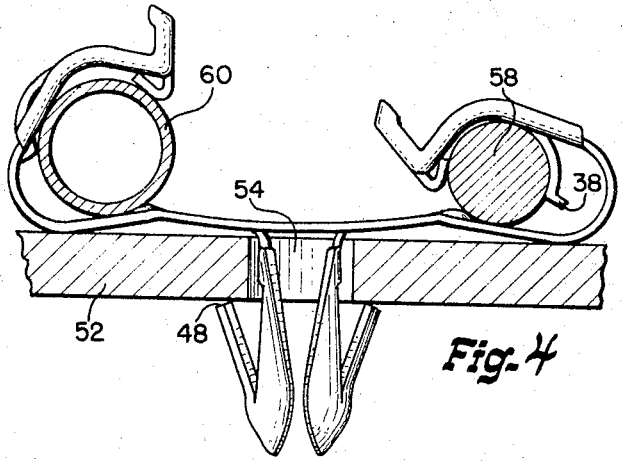
FIG. 4 is an elevational view in partial section showing the device in FIG. 1 mounted in a workpiece and carrying a pair of elongated members.
Figure 5:
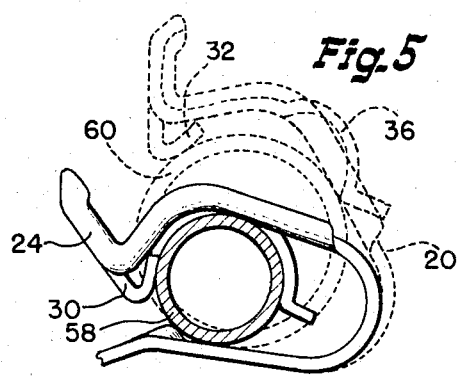
FIG. 5 is a partial view in elevation of the device in FIG. 1 showing its adaptability to accommodate devices having differing diameters; and, FIG. 6 is a second embodiment of the present invention.

The utilization of the present invention is accomplished by telescopically associating stud section 14 with aperture 54 of work support 52 until the downwardly depending arms 18 contact one surface of the work support 52 and are flexed slightly upwardly and the central portion 16 is flexed or bowed downwardly. The arms 46, which are compressed radially inwardly during insertion within the aperture 54, flex outwardly when shoulders 48 pass the extremity of the aperture and are brought into engagement with the opposite surface of work support 52. The outwardly and downwardly extending arms 18 when flexed upwardly accommodate tolerance variations in the work support 52 as well as creating a tendency to further restrict the throat 26 as best seen in FIG. 4. A rod or tube is then inserted through the throat 26 by flexture of bight portion 22 until it is seated into the cavity between the reversely bent portion 20 and the arm 18. The terminal end portion 24 and the tab 30 serve to act as a cam surface to permit ingress into the cavity through the throat with the final position of the workpiece being shown in FIG. 4. One advantage of the present invention, as has been previously stated, is its ability to accommodate cylindrical objects such as rods or tubes, having differing diameters. In FIG. 4 it will be noted that the rod 58 is positively retained by spring arm 36 acting against its surface on one side of its center line while the abutment 32 of tab 30 and the protuberance 40 act against its surface on the opposite side of its center line. When a larger member such as tube 60, seen on the left side of FIG. 4 is inserted through throat 26 the reversely bent portion will be flexed at its bight 22 and curvilinear spring arm 36 moved upwardly into the void from which it was struck to accommodate this greater size. FIG. 5 also clearly shows this relationship of parts in solid lines for a small device 58 and in phantom for a large device 60. Here again, it can be seen that the abutment 32 formed by the second segment of tab 30 and protuberance 40 engage on one side of the center line of the member to be supported while the spring arm 36 engages on the opposite side of the center line and aggressively urges the tube against the abutment and protuberance to positively retain same within the cavity of the hook-like portion as well as preventing a rattling of the member in its located position.

Figure 6:
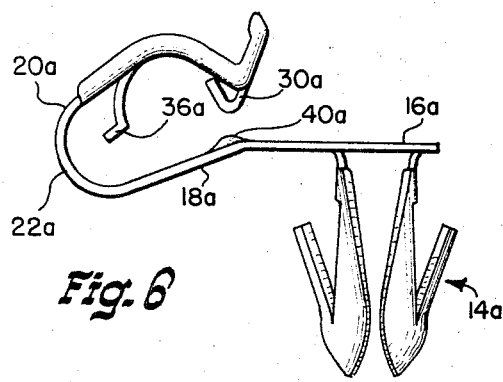

A second embodiment of the present invention is shown in FIG. 6 wherein similar numerals are used to designate similar parts with the addition of the suffix "a." This embodiment has a configuration essentially identical to that shown in FIGS. 1–5 with the exception that central portion 16a is terminated immediately adjacent its juncture with the stud element 14a. Thus, it only has one hook-like portion comprising a downwardly extending arm 18a, a reversely bent portion 20a connected to the arm by bight 22a and having tabs 30a, spring arm 36a and protuberance means 40a. Its operation and function is identical except that it is qualified in only being able to retain a single tube or rod.

From the descriptions set forth hereinabove, it can be seen that applicant has provided a device capable of being readily associated with an apertured work support and provides means for positively retaining a rod or tube in mounted position relative to the work support. The resilient characteristics of bight portion 22 when taken in combination with the restricted throat 26 created by the tabs 30 and protuberances 40, plus the positive retention relative to these restraining features by spring arm 36 results in a clip which has proven functionality in industry. All of the features which present contacting surfaces to the mounted rod or tube have a smooth surface so that tubes or rods made of softer materials than the clip will not be readily scratched, damaged or punctured. The take up of panel thickness tolerances by downwardly extending arms 18 assures a rattle free positive retention of the clip and its associated rods or tubes relative to the work support 52.

While only two embodiments of the present invention have been disclosed, it is felt that other forms will be apparent to those skilled in the art.

I claim:

1. A one piece spring sheet metal clip adapted to retain one or more elongated objects in parallel relation to an apertured work support including a head element and a stud element depending from said head element, said head element including a straight central portion, at least one outwardly and downwardly inclined arm extending from an end of said central portion and including a reversely bent portion forming a flexible bight portion extending from said arm and lying in spaced overlying relation thereto, the terminal end portion of said reversely bent portion extends upwardly and away from said arm to form a cam lead-in surface to said throat, and means including at least one tab struck from the confines of said reversely bent portion and having a first segment extending downwardly toward said arm in the same plane as said terminal end portion and a second segment extending upwardly toward said reversely bent portion, said segments forming an acute angle between them, said means further restricting said throat and adapted to restrain inadvertent removal of said elongated object from between said arm and said reversely bent portion.

2. A clip of the type claimed in claim 1 wherein said reversely bent portion includes second means spaced from said first means to restrain the movement of said object toward said bight portion.

3. A clip of the type claimed in claim 1 wherein said head element includes two arms which extend in opposite directions, each having reversely bent portions and extending in downwardly inclined fashion from said central portion.

4. A clip of the type claimed in claim 2 wherein said second means includes a curvilinear spring arm struck from the confines of said reversely bent arm, said spring arm being concave toward said arm and throat and having its free end spaced from said bight portion and adapted when confronted by an object having a radial dimension larger than its radius to be moved towards said reversely bent portion to occupy the void from which it was struck.

5. A device of the type claimed in claim 1 wherein said stud element includes legs struck from the sheet material of said central portion and said arm, said legs each being curved in transverse section and concave towards one another, each leg having a resilient arm struck therefrom and extending upwardly and outwardly to provide a positive shoulder facing and spaced from said head element, said shoulders being adapted to engage one surface of said work support, said arm of said head element being adapted to engage the opposite surface of said work support in a resilient manner whereby tolerance variations in the thickness of said workpiece are compensated for and flexure of said arm closes up said throat and improves the holding power of said clip.

6. A clip of the type claimed in claim 1 wherein protuberance means having cam surfaces extend from said arm towards said tab to further restrict said throat whereby the objects carried by said clip are positively retained.

7. A one piece resilient sheet metal clip adapted to retain a rod-like member in parallel relation to an apertured work support, said clip including a head element and a shouldered stud element, said head element having an initially straight central portion and a pair of hook-like portions positioned in opposed relation and extending laterally from opposite sides of said central portion, said hook-like portions each including an arm extending outwardly and downwardly from said central portion in the direction of said stud element and a reversely bent portion overlying said arm and forming a resilient bight portion connected to said arm, each of said reversely bent portions having a terminal portion bent upwardly away from said arm to form a cam lead-in to the throat of said hook-like portions, at least one tab means extending toward said arm from and in the same plane as said terminal portion, said tab means being bent upwardly intermediate its extremities towards said reversely bent portion to form a depending abutment and restriction to said throat, a resilient curvilinear spring arm depending from each of said reversely bent portions and being concave in the direction of said arm and said throat, cammed protuberance means projecting up from said arm toward said tab means whereby a rod-like member inserted in one of said hook-like portions will be engaged on one side of its centerline by said tab and said protuberance means and on its opposite side by said curvilinear spring arm, said curvilinear spring arm adapted to flex up into said reversely bent portion when confronted by a rod-like member having a diameter larger than the diametral dimension of said arm segment, said reversely bent portion also being adapted to flex away from said arm whereby said clip can retain a wide variety of diameters of rod-like members, said stud element having shoulder means intermediate its length and spaced from and in opposition to said central portion, said arm portions adapted to flex upwardly to compensate for tolerance variations in the thickness of apertured work supports and also to provide a spring bias on the shoulder means of said stud element.

8. A clip of the type claimed in claim 7 wherein said stud element includes a pair of parallel legs struck from the confines of said central portion and said arms and depending perpendicularly to said central portion, each of said legs being transversely curved in section and being concave toward one another, said shoulder means being formed by the terminal end of an arm struck from each leg and extending upwardly and outwardly from said leg, each of said terminal ends being spaced from said head element, said tab means and said curvilinear arms also being struck from the confines of said clip.

References Cited

UNITED STATES PATENTS

| | | |
|---|---|---|
| 810,004 | 1/1906 | Tabler. |
| 1,896,864 | 2/1933 | Hall _____ 248—73 X |
| 2,061,463 | 11/1936 | Hall _____ 248—73 |
| 2,440,469 | 4/1948 | Goddard _____ 248—68 |
| 3,016,220 | 1/1962 | Rose _____ 248—74 |
| 3,194,524 | 7/1965 | Trumbull _____ 248—68 X |
| 3,216,685 | 11/1965 | Raymond _____ 248—74 |

ROY D. FRAZIER, *Primary Examiner.*

U.S. Cl. X.R.

248—73, 74